Patented May 31, 1927.

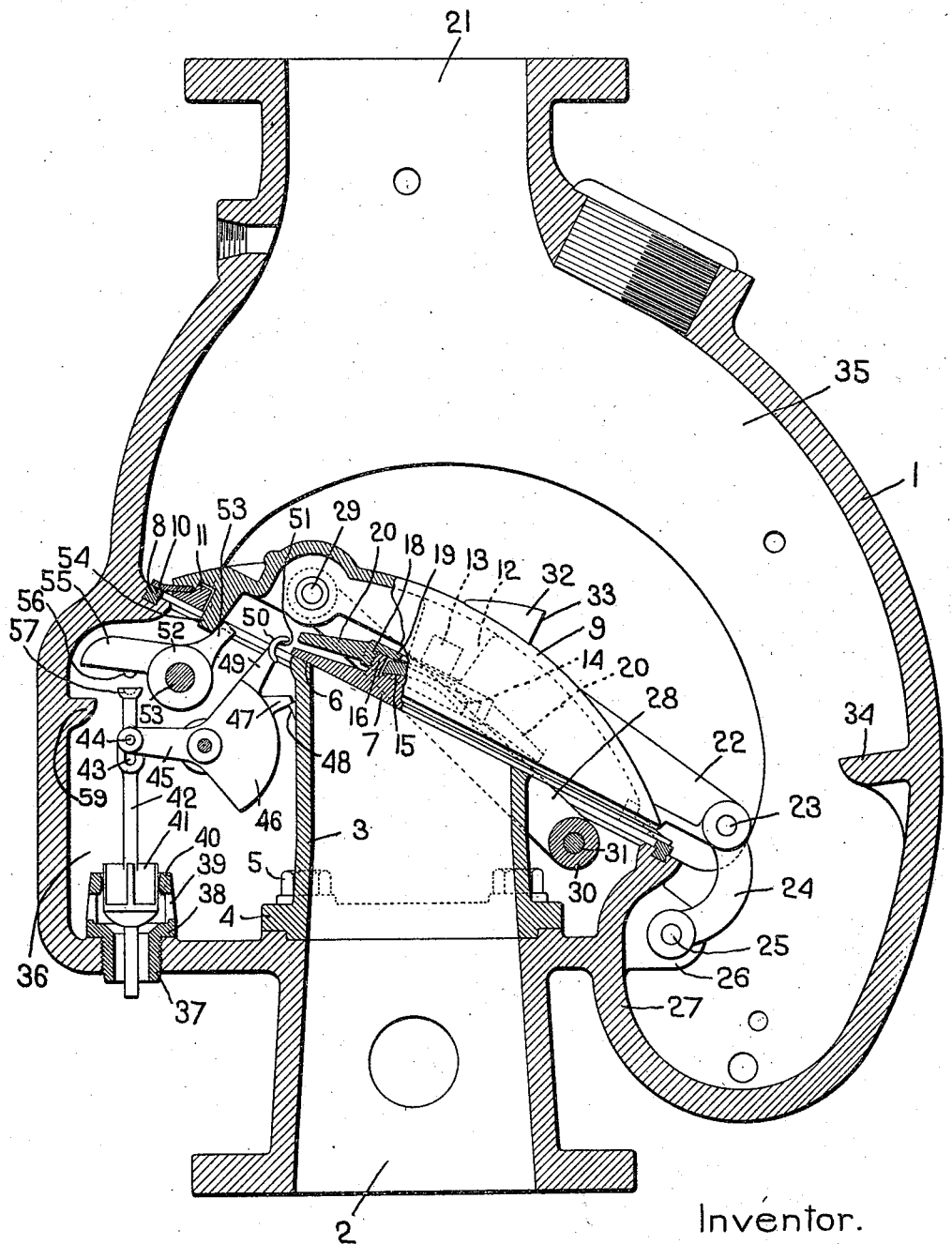

1,630,783

UNITED STATES PATENT OFFICE.

EZRA E. CLARK, OF NEWTONVILLE, MASSACHUSETTS.

DRIP VALVE FOR DRY-PIPE VALVES.

Application filed July 22, 1926. Serial No. 124,173.

This invention relates to improvements in dry pipe valves such as those used in sprinkler systems and the principal object thereof is to provide novel means for causing or permitting quick closing of the drip valve leading from the neutral or intermediate chamber.

More particularly, the invention relates to means operable by the force of the stream of water which is projected from the water inlet upon the initial opening movement of the water valve immediately to close the drip valve, thereby causing the water discharged into the neutral chamber to build up rapidly a pressure in said neutral chamber which will force the air valve from its seat and aid in swinging the air and water valves out of the waterway.

A further object of the invention is to provide means for accomplishing this purpose which are located outside of the waterway.

The invention is particularly but not necessarily adapted for use in dry pipe valves in which the air valve is provided with a circumferential flap of flexible material such as rubber which engages the air valve seat, and in which the water valve is connected to the air valve in such a manner as to permit relative movement therebetween, so that when the pressure in the sprinkler system is reduced by the fusing of the sprinkler head, the water valve is permitted to open slightly before the air valve is unseated, thereby projecting a stream of water laterally from the water inlet. In such dry pipe valves the present invention comprises means located in the path of this laterally diverted stream which is adapted to permit or to cause the closing of the drip valve for the purpose above defined.

Other objects and features of the invention will more fully appear from the following description and the accompanying drawing, and will be particularly pointed out in the claims.

The drawing illustrates a vertical sectional view of a dry pipe valve embodying a preferred form of the invention.

The dry pipe valve illustrated in the accompanying drawing comprises a casing 1 of generally spherical form having an inlet conduit 2, which, for convenience of construction may be formed in two sections, one of which forms an extension 3 projecting into the interior of the casing, having a flange 4 secured to the casing by bolts 5. The upper end of the conduit section 3 is provided with an inclined seat 6 for the water valve 7.

The casing is provided with an annular air valve seat 8, which desirably lies in substantially the same plane as the plane of the water valve seat and in the particular structure illustrated herein this plane is inclined to the axis of the inlet conduit. The air valve 9 is of circular form and of considerably greater area than the water valve, and its periphery is provided with an externally projecting flap 10 of flexible material such as rubber to engage the air valve seat 8. The flap 10 is secured to the valve by a clamping ring 11. By this construction an air tight contact of the air valve with the valve seat is insured.

The air valve preferably is of concave form and has a lug 12 projecting from its under surface to which a stud 13 is secured by a screw threaded connection. The stud has a spherically convex head 14 which seats upon a complementary spherical surface 15 in the central portion of the water valve 7. The water valve 7 has an upwardly extending annular rib 16 which loosely encloses the head 14 of the stud and is provided with a screw threaded periphery upon which a nut or cap 18 is mounted which is provided with an inwardly extending flange 19 which overlies the head 14 of the stud. The nut or cap 18 desirably is provided with one or more arms 20 by means of which it can be conveniently rotated. By reason of this connection a limited relative rocking movement between the water valve and the air valve is permitted.

The casing has an outlet 21 in axial alinement with the inlet conduit and the valves are so hung that when they are swung from their seats an unimpeded waterway is provided through the casing. In the preferred construction illustrated herein the air valve is provided at its lower end with an integral extension or arm 22, which is pivotally connected by a pin 23 to the upper end of a bifurcated link 24, the lower end of which is pivotally mounted upon a pin 25 mounted in bosses 26 extending from the curved interior wall 27 of the casing which forms the air valve seat 8. To insure proper movement of the valve a double link member 28 is pivotally connected by pins 29 to the upper portion of the valve and the sleeve 30, which is integral with and connects the links, is pivotally mounted upon a pin 31 carried by the casing and located below the air valve seat between the walls 27 and the extension 3 of the inlet conduit. By reason of these link connections the valves when swung open will be guided into such position that both valves will be out of the waterway through the casing. The air valve desirably is provided with a lug 32 presenting a shoulder 33 adapted to engage the shoulder 34 of a lug projecting inwardly from the casing which will serve to arrest the movement of the valve when thrown open and permit it to remain in proper position out of the waterway. The valves when seated divide the casing into an upper chamber 35 which communicates with the usual sprinkler system, in which air under sufficient pressure is introduced to hold the air and water valves seated against the pressure which is produced by the water in the inlet conduit, and a neutral chamber 36 which is provided with a drip valve port 37 communicating with the atmosphere so that the air in the neutral chamber normally remains at atmospheric pressure. A drip valve seat 38 is provided with a hollow screw threaded stem which engages the walls of the port, and upwardly extending arms 39 having at their upper end an integral ring 40 which acts as a guide for a drip valve 41. The dry pipe valve construction above described is of the general type disclosed in prior patents.

In the present construction the drip valve 41 has an upwardly extending stem 42 which is united by a lost motion connection to the arm of a lever which normally holds the drip valve 41 in open position. The lost motion connection illustrated herein comprises an enlarged slotted portion 43, the slot of which receives the pin 44 mounted on bosses in the end of a bifurcated arm 45 of a lever, the opposite arm 46 of which is enlarged to provide a counterweight acting normally to hold the valve to open position. The counterweight 46 is provided with a projection 47 which normally engages the shoulder of a lug 48 projecting from the outer wall of section 3 of the inlet conduit. The counterbalanced lever is provided with an upwardly extending arm 49 having at its end a relatively wide vane 50 presenting a concave surface 51, the centre of the curvature of which lies substantially in the plane of the water valve seat. This vane desirably is located upon the diametrically opposite side of the inlet pipe to the pivotal supports for the guiding links 24 and 28 which direct the movement of the air valve and water valve to open position.

In the operation of this device a diminution of pressure upon the air valve, caused by the leakage of air from the system when a sprinkler head opens permits the pressure of the water to raise the water valve slightly from its seat before the air valve opens, as the flexible peripheral flap of the air valve will yield sufficiently to permit a limited rocking movement before unseating the air valve. The water valve therefore will be raised from its seat at the side nearest the vane 50 as this side is farthest from the pivotal connection of the valves to the casing. The stream of water which is thus discharged from the inlet conduit impinges upon the vane 50 of the counterbalancing lever, thereby overcoming the weight of the counterbalance, thus rocking the lever 45, permitting the drip valve 41 to seat. Continued movement of the lever under the force of the stream will cause the pin 44 in the arm 45 of the lever to move to the lower end of the slot 43 in the valve stem and will positively keep the valve upon its seat. The force of the stream of water thus discharged from the inlet conduit will therefore quickly close the drip valve, and the continued discharge of water into the neutral chamber will build up a pressure in it which will act upon the under surface of the air valve and result in unseating the valve, and will move the air and water valves from their seats out of the waterway to one side of the casing. By reason of this construction, therefore, a more rapid closing movement of the drip valve is effected, and a quick opening of the water and air valves insured upon the opening of a sprinkler head.

In order to prevent water columning, the usual counterweighted latch 52 is pivotally mounted upon a pin 58 which extends across the neutral chamber and is provided with an arm 53, which, when the valve is closed, is engaged by the inner wall of a lug 54 which extends downwardly from the air valve. The latch 52 is also provided with a heavy laterally extending arm 55 forming a counterweight adapted when the air valve is open to rock the latch about its pivotal support so that the end of the arm 53 will engage the lower end of the lug 54 of the air valve and hold the valve away from its seat. The counterweighted arm 55 of the latch extends across the axis of the drip valve stem 42 and when the latch is released by the opening of the air valve, drops upon the lug 59 at the side of the casing.

The counterweighted arm 55 is provided with a projection 56 which engages the enlarged upper end of the drip valve stem. The drip valve is provided with a downwardly extending stem which projects through the drip valve port a sufficient distance to enable the drip valve to be raised from its seat and simultaneously therewith to rotate the latch out of engagement with the lug upon the air valve, and permit the resetting of the water and air valves.

While the invention is disclosed herein as applied to a dry pipe valve construction in which the air valve has a circumferential flap of flexible material which enables the water valve first to be raised from its seat, it should be apparent that the invention is applicable to other types of dry pipe valves, as the simultaneous initial opening of such valves would cause a stream of water to be projected laterally upon a vane, or other suitable device operable to close the drip valve quickly.

It will be obvious that whereas the drip valve in the present construction is so arranged as to close by its own weight upon the overcoming of the counterweight, other types of drip valve may be employed, or the drip valve located in the side wall of the neutral chamber with mechanism so arranged that the force of the stream of water produced upon initial opening of the water valve will close the drip valve. It will also be obvious that the drip valve may be positioned in other relations with respect to the water valve than that particularly illustrated herein, as may be necessitated or desirable by other types of dry pipe valves.

It will, therefore, be understood that the embodiment of the invention disclosed herein is of an illustrative character and is not restrictive of the meaning and scope of the following claims.

Having thus described my invention, what I claim as new and desire to secure by Letters Patent, is:

1. A dry pipe valve comprising a casing with an air valve and a water valve therein with valve seats for said valves and having a neutral chamber between said valves, provided with a drip valve port, a drip valve for said port, and means operable by the force of a stream of water discharged upon initial opening of the water valve to effect a quick closing of said drip valve.

2. A dry pipe valve comprising a casing with an air valve and a water valve therein with valve seats for said valves and having a neutral chamber between said valves, provided with a drip valve port, a drip valve for said port, and means located outside of the waterway operable by the laterally flowing stream produced by the initial opening of the water valve to effect a quick closing of said drip valve.

3. A dry pipe valve comprising a casing with an air valve and a water valve therein with valve seats for said valves and having a neutral chamber between said valves, provided with a drip valve port, a drip valve for said drip port, tending to close by its own weight, counterbalancing means acting normally to maintain said drip valve in open position and means operable by the force of the stream of water discharged upon initial opening of the water valve to overcome said counterweight, and to permit a quick closing of said drip valve.

4. A dry pipe valve comprising a casing, an air valve and a water valve therein, with seats for said valves and having a neutral chamber between said valves provided with a drip valve port, a drip valve for said port tending to close by its own weight, a counterbalanced lever normally holding said drip valve in open position, provided with a vane lying in the path of the stream of water discharged upon initial opening of the water valve whereby the force of the stream will overcome said counterbalance and permit quick closing of said drip valve.

5. A dry pipe valve comprising a casing, an air valve and a water valve therein, with seats for said valves and having a neutral chamber between said valves provided with a drip valve port, a drip valve for said port tending to close by its own weight, a lever having one arm connected to said drip valve by a lost motion connection, a counterbalancing arm normally acting to hold said drip valve in open position, and a vane on said counterbalancing arm lying in the path of the stream discharged upon initial opening of said water valve whereby the force of said stream will effect a quick closing of said drip valve.

6. A dry pipe valve comprising a casing having an air valve seat and a water inlet provided with a water valve seat, air and water valves operable when seated to provide a neutral chamber between said valves, a drip valve for said neutral chamber, means pivotally mounted at one side of said inlet to cause said air and water valves when opening to swing to one side of the water way, and means located at the opposite side of said inlet in the path of the stream of water diverted laterally from said inlet upon initial opening of the water valve effecting quick closing of the drip valve.

7. A dry pipe valve comprising a casing having an air valve seat and a water inlet provided with a valve seat, an air valve having a circumferentially projecting flap of flexible material to engage said air valve seat, a water valve, means connecting said water valve and air valve to form a loose connection operable to permit relative movement therebetween, said valves when seated providing a neutral chamber between said valves, a drip valve for said chamber, means located in said neutral chamber operable by the force of the stream of water diverted laterally from said inlet by the initial opening movement of the water valve permitted by the yielding movement of the flexible circumferential flap of the air valve before the unseating of said air valve to effect the quick closing of the drip valve whereby the building up of pressure in said neutral chamber by the water discharged therein will effectively aid in swinging said valves out of the waterway.

8. A dry pipe valve comprising a casing, an air valve and a water valve therein with seats for said valves, and having a neutral chamber between said valves provided with a drip port, a drip valve tending to close by its own weight, and having a vertical stem, a counterbalanced lever having a lost motion connection with said drip valve stem, a vane upon said counterbalanced lever lying in the path of the stream of water discharged upon initial opening of the water valve operable to overcome the counterbalancing weight of said lever and permit quick closing of the drip valve, a latch to hold said air valve open when it is lifted from its seat pivotally mounted on said casing independently of said drip valve mechanism and having a counter weight operable upon the opening of the air valve to swing said latch to operative position, and means operable through drip valve rod for resetting the latch.

In testimony whereof, I have signed my name to this specification.

EZRA E. CLARK.